(12) United States Patent
Orr et al.

(10) Patent No.: US 6,331,707 B1
(45) Date of Patent: Dec. 18, 2001

(54) ELECTROSTATIC MONITORING

(75) Inventors: Christopher Henry Orr; Craig Janson Luff; Thomas Dockray, all of Cumbria (GB); Duncan Whittemore Macarthur, Los Alamos, NM (US)

(73) Assignees: British Nuclear Fuels PLC, Cheshire (GB); Regents of the University of California, Oakland, CA (US)

( * ) Notice: Subject to any disclaimer, the term of this patent is extended or adjusted under 35 U.S.C. 154(b) by 0 days.

(21) Appl. No.: 09/307,226

(22) Filed: May 7, 1999

(30) Foreign Application Priority Data

May 8, 1998 (GB) ................................ 9809745

(51) Int. Cl.[7] ..................................... G01T 1/18
(52) U.S. Cl. .......................... 250/387; 250/380; 250/394; 250/376
(58) Field of Search .................... 250/387, 380, 250/394, 376

(56) References Cited

U.S. PATENT DOCUMENTS

| | | | |
|---|---|---|---|
| 4,426,580 | 1/1984 | Smith | 250/374 |
| 4,814,608 | 3/1989 | Dempsey et al. | 250/253 |
| 4,853,536 | 8/1989 | Dempsey et al. | 250/253 |
| 4,992,658 | 2/1991 | Ramsey et al. | 250/253 |
| 5,008,540 | 4/1991 | Dempsey | 250/336.1 |
| 5,055,674 | 10/1991 | Kotrappa | 250/255 |
| 5,059,803 | 10/1991 | Kronenberg | 250/385.1 |
| 5,107,108 | 4/1992 | Ramsey et al. | 250/253 |
| 5,126,567 | 6/1992 | Dempsey et al. | 250/336.1 |
| 5,128,540 | 7/1992 | Stieff | 250/255 |
| 5,184,019 | 2/1993 | MacArthur et al. | 250/380 |
| 5,187,370 | 2/1993 | MacArthur et al. | 250/379 |
| 5,194,737 | 3/1993 | MacArthur et al. | 250/382 |
| 5,281,824 | 1/1994 | MacArthur et al. | 250/380 |
| 5,311,025 | 5/1994 | MacArthur et al. | 250/374 |
| 5,426,305 | * 6/1995 | Siebentritt, Jr. et al. | 250/376 |
| 5,514,872 | 5/1996 | Bolton et al. | 250/380 |
| 5,525,804 | 6/1996 | MacArthur et al. | 250/374 |
| 5,550,381 | 8/1996 | Bolton et al. | 250/380 |
| 5,663,567 | 9/1997 | Steadman et al. | 250/382 |
| 5,679,958 | 10/1997 | MacArthur | 250/382 |
| 5,877,502 | 3/1999 | Koster et al. | 250/382 |

FOREIGN PATENT DOCUMENTS

| | | | | |
|---|---|---|---|---|
| 0857005 | 2/1959 | (GB) | | 39/1 |
| 2301222 | 11/1996 | (GB) | | 47/2 |
| WO 97/45754 | 12/1997 | (WO) | | 1/18 |

* cited by examiner

*Primary Examiner*—Constantine Hannaher
*Assistant Examiner*—Andrew Israel
(74) *Attorney, Agent, or Firm*—Workman, Nydegger & Seeley

(57) ABSTRACT

The apparatus and method provide a technique for more simply measuring alpha and/or beta emissions arising from items or locations. The technique uses indirect monitoring of the emissions by detecting ions generated by the emissions, the ions being attracted electrostatically to electrodes for discharge of collection. The apparatus and method employ a chamber which is sealed around the item or location during monitoring with no air being drawn into or expelled from the chamber during the monitoring process. A simplified structure and operations arises as a result, but without impairing the efficiency and accuracy of the detection technique.

22 Claims, 1 Drawing Sheet

ELECTROSTATIC MONITORING

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of CRADA No. LA96C10298 and Contract No. W-7405-ENG-36 awarded by the U.S. Department of Energy.

BACKGROUND OF THE INVENTION

1. Field of the Invention

This invention concerns improvements in and relating to item monitoring, particularly but not exclusively to the monitoring of alpha contamination on large items.

2. Present State of the Art

Direct monitoring of the alpha contamination is only possible using detectors presented very close to the actual source of the alpha particles due to their limited range. Techniques have been developed whereby the ions generated by the passage of alpha particles through air can be detected at long range so as to evaluate the alpha contamination present.

Systems using the principal of long range alpha detection have been developed whereby air is drawn through a filter into a chamber, passes the item under investigation, passes on to a detection unit and subsequently exits the apparatus through an outlet filter. Such systems are relatively complicated as filtration of the feed air is necessary to avoid the introduction of ions from the ambient environment into the chamber and filtration of the outlet flow is necessary to avoid contamination being spread from the item into the environment.

BRIEF SUMMARY AND OBJECTS OF THE INVENTION

The present invention aims to provide a simpler, more cost effective method for monitoring items for alpha contamination, amongst other forms, without the need for an inflow and outflow of air.

According to a first aspect of the invention we provide an instrument for monitoring alpha and/or beta emitting sources on an item/location, the item/location being in contact with a medium, alpha and/or beta emissions generating ions in the medium, the instrument having a detecting chamber, the detecting chamber being provided with one or more electrodes in contact with the medium for discharging and/or collecting ions, a potential being applied to the electrode(s) to electrostatically attract ions thereto, the instrument further being provided with means to monitor ions discharged on one or more of the electrode(s), the detecting chamber comprising a sealable chamber.

The item(s) to be monitored may be or include tools, pipes, pumps, filters, cables, beams, rods and the like. The locations may include surfaces in general, such as floors, walls, ceilings, soil, rubble, material on a conveyor, and include parts of, or surfaces of items, such as glove boxes, tanks, vessels and the like.

The item or location may be introduced to within the detecting chamber. The detecting chamber may be introduced to around the item or location. The item or location may be monitored in-situ, for instance still mounted on a floor Alpha impermeable and/or beta impermeable and preferably gamma impermeable shielding may be provided to cover non-desired items or non-desired locations within the detecting chamber.

The item may be suspended within the detector chamber, for instance by hanging. The item may be mounted on a support, such as a grid, to maximize the surface area of the item exposed for detection.

The medium may be a fluid, such as a liquid, but is preferably a gas. The gas may be a mixture, such as air, or may be in substantially single gas form, such as argon.

The detecting chamber is preferably electrically conducting. The detecting chamber may comprise an elongate chamber. The detecting chamber may have a circular or rectilinear cross-section. The detecting chamber may be openable to introduce or remove an item or location. Preferably the chamber is completely sealed relative to its environment in use.

The instrument may be provided with a single electrode. Preferably the electrode extends over a substantial part of at least one wall of the chamber. The instrument may be provided with a charge element or disc, such as an electret. One or more, and preferably all, of the electrodes may be planar. The electrodes may be continuous, such as a plate, or discontinuous, such as a grid. A grid, preferably spaced from the adjoining wall of the chamber is preferred.

An applied, preferably externally generated, potential may be employed. The electrical potential is preferably provided by an external power source. An electrostatic potential may be employed, for instance from a charge element or disc, such as from an electret.

Potentials of between 10V and 1000V may be provided.

The means for monitoring ions discharged and/or collected on the electrode(s) may comprise electrostatic charge monitoring means. More preferably the means for monitoring ions discharged on the electrode(s) comprise current indicating means and more preferably current measuring means. Preferably a single current measuring means is used. Preferably the combined current of a plurality of the electrodes, such as alternate electrodes connected to the current measuring means is measured. An electrometer, such as a ground referenced electrometer or floating electrometer may be used for this purpose.

Means, such as a fan, may be provided for moving the fluid within the chamber. The fluid is preferably moved to promote even distribution of the ions within the chamber. The speed and/or position of the fan may be variable and/or controllable.

The detecting chamber may be provided at an elevated pressure relative to atmospheric.

According to a second aspect of the invention we provide a method for monitoring alpha and/or beta emitting sources on an item/location, the method comprising providing the item/location in a detecting chamber, contacting the item/location with a medium, alpha and/or beta emissions generating ions in the medium, the detecting chamber being provided with one or more electrodes for discharging ions, the electrode(s) contacting the medium, applying an electrical potential to one or more of the electrodes to electrostatically attract ions thereto, the method further comprising monitoring ions discharged on the electrode(s), the item/location being sealed within the detector chamber.

The method may include the passage of a period of time, after the item/location is provided, and after the chamber is sealed, before the electrical potential is applied. The delay may be provided to enable an equilibrium level of ions within the chamber to be reached.

The method may include promoting the mixing of the medium within the chamber. The mixing of the medium may be promoted by a fan and/or the internal configuration of the chamber, for instance through baffles.

The second aspect of the invention includes the features, options and possibilities set out elsewhere in this application, including the steps necessary to implement them.

BRIEF DESCRIPTION OF THE DRAWINGS

Various embodiments of the invention will now be described, by way of example only, and with reference to the accompanying drawings in which.

DETAILED DESCRIPTION OF THE PREFERRED EMBODIMENT

The monitoring of alpha and/or beta and/or gamma emissions from an article or area is of particular significance during its decommissioning, monitoring and a variety of other applications. An accurate calculation of the level of contamination present enables the correct decision to be taken in classifying material/locations in terms of its grade or the most suitable decontamination process.

Figure 1:
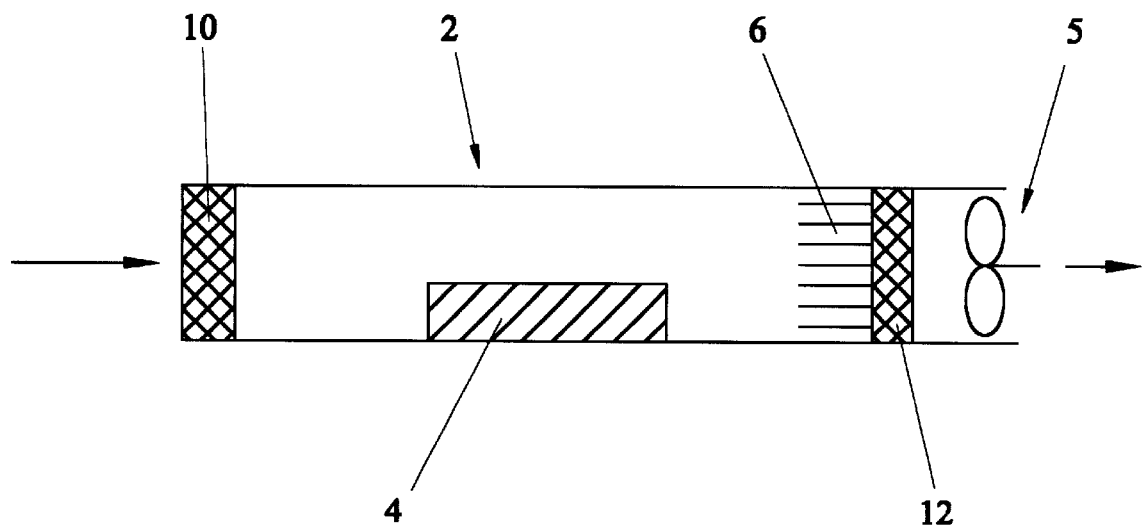
FIG. 1 illustrates schematically a prior art alpha detection instrument.

Alpha determination for small items, such as spanners, are known in terms of the type of instrument schematically illustrated in FIG. 1.

The instrument uses the principal that whilst direct alpha particle detection is not practicable, detection of alpha particles emitted into the medium, such as air from the contamination and/or location and/or item can successfully be indirectly monitored. Whilst alpha particles only travel a few centimetres in air and, as a consequence, a detector unit at any distance from the item cannot detect alpha particles directly, during the course of their travel through the air the alpha particles cause ionisation of a significant number of air molecules. These ionised molecules remain in that state for a substantial period of time and this is sufficient to enable them to be drawn from the contamination to a detector array.

Thus in the instrument of FIG. 1 an item 4 to be monitored is placed in a container 2 which contains a detector array 6 formed of a number of parallel plates 8. A flow of air through the instrument passed the item 4 and onto array 6 is ensured by fan 5.

An electric field is generated between the plates by applying a different potential to alternating plates. In this way the charged ions generated by alpha emission from the item 4 on entering the electric field are attracted to the plates 8 of the detector array 6. The current resulting from these ions is detected by an electrometer so as to give a measure of the ion level presence and hence the alpha contamination presence.

The ions in this instrument need to be conveyed to the electric field by the flow of air. The air enters the instrument via filter 10, which air flow then passes between the plates 8 and subsequently out of the instrument through filter 12.

The problem with such arrangements is that they need a flow of air into and out of the apparatus to achieve the monitoring. This necessitates filters to isolate the item 4 from the surrounding environment, as well as to prevent ions, present in ambient air, from entering the instrument and giving a false reading. Contamination of the filters occurs over time with such systems necessitating periodic replacement and expensive disposal.

Figure 2:
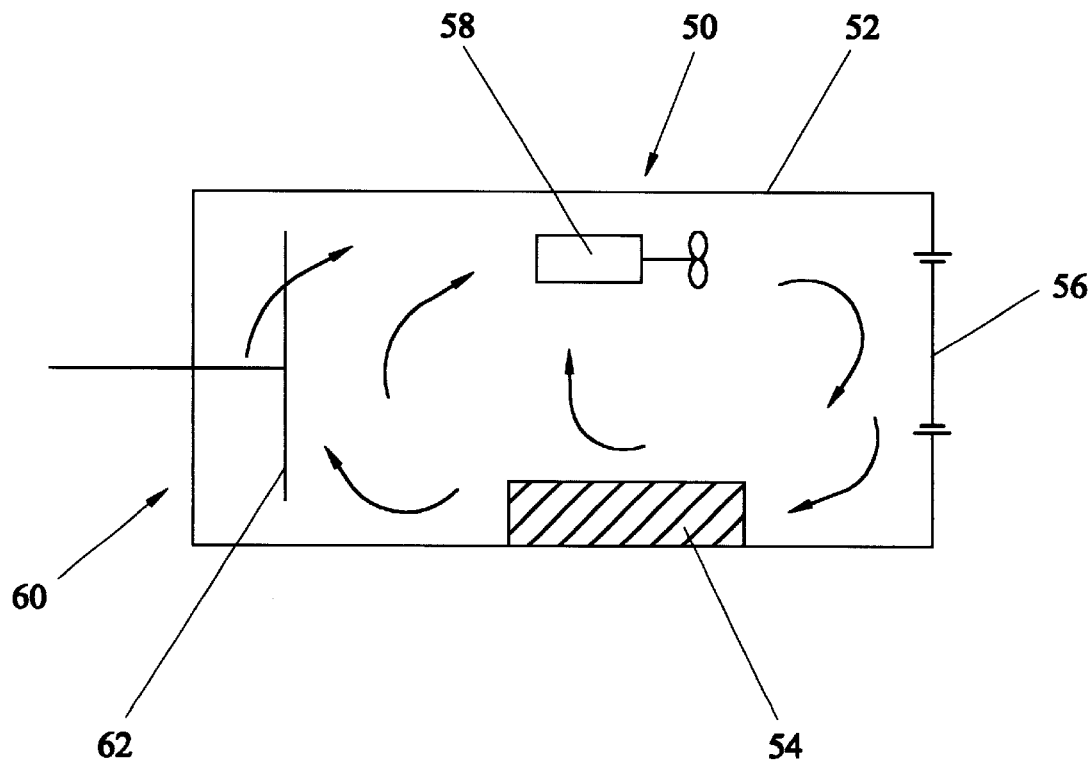
FIG. 2 illustrates an instrument according to a first embodiment of the present invention.

In the embodiment of the invention of FIG. 2 the instrument 50 consists of a continuous electrically conducting enclosure 52 into which an item 54 to be monitored can be introduced through door 56. The item 54 can be positioned on a support surface, not shown, formed by a grid so as to allow air contact with as much of the item as possible. The possibility of hanging the item from the top of the container also applies, not shown. Using a hanging support or gird support or the like the item may be rotated by the support during monitoring to ensure even presentation of ions. This is particularly applicable if transient monitoring conditions are to be employed.

Once sealed within the enclosure 52 alpha emissions from the item 54 cause ionisation in the enclosure 52. The level of ions builds up until a steady state, equilibrium condition is reached. A fan unit 58 is provided within the enclosure 52 to promote air circulation. The circulation is intended to promote even mixing of air within the enclosure 52 so as to provide an even ion level, rather than to preferentially convey ions from in proximity to the item 54, where they are generated, to the detector array.

The detector array 60 within the enclosure consists of a single electrode 62 of relatively large size when compared with the volume of the enclosure 52. In the illustrated form the electrode 62 occupies a full wall of the enclosure. The electrode takes the form of a grid which is spaced from the wall of the enclosure so as to aid air flow to and indeed through the electrode 62. The electrode 62 is maintained at an elevated potential to attract ions of one polarity towards it. As the ions in the enclosure are at an equilibrium level the current detected is representative of the overall contamination of the item 54.

To achieve a faster analysis the need for equilibrium conditions to be reached can be removed and detection of ions can be performed in the transient state, ions being detected soon after they are formed.

To assist in achieving a representative result for the alpha analysis it may be desirable to provide a directionally controllable and/or speed controllable fan. Controlling the direction of the airflow within the unit can also assist in generating a preferential airflow for conveying ions to the detector.

In an alternative form of the invention, not illustrated, an instrument according to the general type illustrated in FIG. 2 can be positioned around an item to be monitored in the general sense of a hood. This is particularly of use where it is desired to leave the item in-situ, if at all possible, and/or the item is too bulk or heavy to readily introduce to a closed vessel with a floor.

Shielding for alpha and/or beta and/or gamma emissions from the part of the floor or support enclosed in the hood can be provided by covering those areas with suitable material.

The embodiments of the invention described above address alpha particle determinations but it is perfectly possible to incorporate gamma and/or beta detectors in such an instrument alternatively or additionally. Beta detection can be undertaken directly or alternatively by calculation from the gamma emissions recorded. The emitted particle path lengths in the detecting chamber may be sufficiently long for beta emission detection, by detecting ions generated, may be used, in a manner similar to that detailed for alpha detection.

Instruments of the proposed type offer fully sealed analysis systems without the need for inlet air to be filtered. The risks of exhausting contamination from the chamber into the surroundings are avoided as an outlet is not needed.

What is claimed is:

1. An instrument for monitoring alpha and/or beta emitting sources on an item or location, the item or location being in contact with a medium, alpha and/or beta emissions generating ions in the medium, the instrument comprising:

a container bounding a detecting chamber, the detecting chamber being configured to selectively receive the item or location so that the item or location is sealed in a substantially air-tight fashion within the detecting chamber;

an electrode disposed within the detecting chamber, the electrode being adapted to receive an electrical potential so that the electrode electrostatically attracts the ions generated by the alpha and/or beta emissions when the medium and the item or location are sealed in the substantially air-tight fashion within the detecting chamber; and means for monitoring ions discharged and/or collected on the electrode.

2. An instrument according to claim 1 further comprising means for moving the medium within the sealed detecting chamber.

3. An instrument according to claim 1 in which the item or location is disposed within the detecting chamber.

4. An instrument according to claim 1 in which the detecting chamber is disposed around the item or location.

5. An instrument according to claim 1 wherein the electrode extends over a substantial part of at least one wall of the detecting chamber.

6. An instrument according to claim 1 in which the means for monitoring ions discharged and/or collected on the electrode comprises an electrostatic charge monitor.

7. An instrument according to claim 1 in which the means for monitoring ions discharged and/or collected on the electrode comprises a current measurer.

8. An instrument as recited in claim 1, further comprising one or more electrodes disposed within the detecting chamber.

9. An instrument as recited in claim 1, wherein the container independently bounds the detecting chamber so as to seal the detecting chamber in the substantially air-tight fashion.

10. A method for monitoring alpha and/or beta emitting sources comprising:

positioning an item or location within a detecting chamber so that the item or location is substantially sealed from atmospheric air outside of the detecting chamber, the item or location having alpha and/or beta emitting sources thereon that generate ions within a medium disposed within the detecting chamber;

applying an electrical potential to an electrode sealed within the detecting chamber so that the electrode electrostatically attracts the ions within the detecting chamber; and monitoring the ions discharged and/or collected on the electrode.

11. A method according to claim 10 in which the method includes the passage of a period of time between positioning the item or location within the detecting chamber and applying the electrical potential to the electrode.

12. A method according to claim 11 wherein the period of time is sufficient to enable an equilibrium level of ions within the sealed detecting chamber to be reached.

13. A method according to claim 10 further comprising moving the medium within the sealed detecting chamber to promote even distribution of the ions within the detecting chamber.

14. A method according to claim 10 further comprising positioning alpha impermeable and/or beta impermeable and/or gamma impermeable shielding so as to cover non-desired items or non-desired locations within the sealed detecting chamber.

15. A method according to claim 10 wherein the act of positioning the item or location within the detecting chamber comprises suspending the item within the detecting chamber.

16. A method according to claim 10 further comprising elevating the pressure within the detecting chamber relative to the surrounding atmosphere.

17. A method as recited in claim 10 wherein the act of positioning an item or location within a detecting chamber comprises the item or location being comprised of a solid material.

18. A method for monitoring alpha and/or beta emitting sources comprising:

positioning an item or location within a detecting chamber so that the item or location is substantially sealed from atmospheric air outside of the detecting chamber, the item or location having alpha and/or beta emitting sources thereon that generate ions within a medium disposed within the detecting chamber;

allowing the ions generated within the detecting chamber to at least substantially reach a level of equilibrium;

applying an electrical potential to an electrode sealed within the detecting chamber so that the electrode electrostatically attracts the ions within the detecting chamber, the electrical potential being applied after the ions have at least substantially reached the level of equilibrium; and monitoring the ions discharged and/or collected on the electrode.

19. A method according to claim 18 further comprising moving the medium within the sealing detecting chamber to promote even distribution of the ions within the detecting chamber.

20. A method according to claim 18 further comprising covering non-desired items or non-desired locations within the sealed detecting chamber with alpha impermeable and/or beta impermeable and/or gamma impereamble sheilding.

21. A method according to claim 18 wherein the act of positioning the item or location within the detecting chamber comprises suspending the item within the detecting chamber.

22. A method according to claim 18 further comprising elevating the pressure within the detecting chamber relative to the surrounding atmosphere.

* * * * *

UNITED STATES PATENT AND TRADEMARK OFFICE
CERTIFICATE OF CORRECTION

PATENT NO.     : 6,331,707 B1
DATED          : December 18, 2001
INVENTOR(S)    : Christopher Henry Orr et al.

It is certified that error appears in the above-identified patent and that said Letters Patent is hereby corrected as shown below:

Column 1,
Line 67, after "floor" insert a period

Column 4,
Line 15, after "52" insert a comma
Line 51, before "or heavy" change "bulk" to -- bulky --

Signed and Sealed this

Eleventh Day of March, 2003

JAMES E. ROGAN
*Director of the United States Patent and Trademark Office*